(12) United States Patent
Dirauf

(10) Patent No.: US 10,268,623 B2
(45) Date of Patent: Apr. 23, 2019

(54) METHOD FOR OPERATING A DATA TRANSFER SYSTEM, AND DATA TRANSFER SYSTEM

(71) Applicant: SIEMENS MOBILITY GMBH, Munich (DE)

(72) Inventor: Michael Dirauf, Bad Staffelstein (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 15/761,126

(22) PCT Filed: Sep. 6, 2016

(86) PCT No.: PCT/EP2016/070962
§ 371 (c)(1),
(2) Date: Mar. 19, 2018

(87) PCT Pub. No.: WO2017/055026
PCT Pub. Date: Apr. 6, 2017

(65) Prior Publication Data
US 2018/0260356 A1  Sep. 13, 2018

(30) Foreign Application Priority Data
Sep. 30, 2015 (DE) .......... 10 2015 218 906

(51) Int. Cl.
*G06F 13/42* (2006.01)
*B61L 15/00* (2006.01)
(Continued)

(52) U.S. Cl.
CPC .......... *G06F 13/42* (2013.01); *B61L 15/0036* (2013.01); *B61L 15/0063* (2013.01);
(Continued)

(58) Field of Classification Search
CPC .................. G06F 13/42; G06F 13/24; H04L 2012/40293; B61L 15/0036; B61L 15/0063; B61L 15/0081
See application file for complete search history.

(56) References Cited

U.S. PATENT DOCUMENTS 5,404,465 A     4/1995  Novakovich et al.
6,321,174 B1 *  11/2001 Chen .................. G06F 13/4068
                                                   702/122
(Continued)

FOREIGN PATENT DOCUMENTS

DE     102004008910 A1   9/2005
DE     102006008065 B4   1/2008
(Continued)

*Primary Examiner* — Henry Tsai
*Assistant Examiner* — Christopher A Daley
(74) *Attorney, Agent, or Firm* — Laurence Greenberg; Werner Stemer; Ralph Locher

(57) ABSTRACT

A method for operating a data transfer system includes connecting a first data transfer device to a first data line which is connected to a first data interface, connecting a second data transfer device to a second data line which is connected to a second data interface, and transferring data over the first data interface. In order to achieve reliable operation of the data transfer system, a transfer of data through the second data interface is prevented. A data transfer system and a rail vehicle set having a plurality of railcars and a data transfer system are also provided.

16 Claims, 5 Drawing Sheets

(51) Int. Cl.
    *G06F 11/20*         (2006.01)
    *H04L 12/40*         (2006.01)
    *H04L 12/413*        (2006.01)
    *G06F 13/24*         (2006.01)

(52) U.S. Cl.
    CPC ...... *B61L 15/0081* (2013.01); *G06F 11/2002*
    (2013.01); *G06F 13/24* (2013.01); *H04L*
    *12/40176* (2013.01); *H04L 12/413* (2013.01);
    *H04L 2012/40293* (2013.01)

(56) References Cited

U.S. PATENT DOCUMENTS

| | | | | |
|---|---|---|---|---|
| 7,861,110 B2* | 12/2010 | Haley | ................ | G06F 11/2007 |
| | | | | 714/4.1 |
| 7,983,250 B2 | 7/2011 | Enders et al. | | |
| 8,195,840 B2* | 6/2012 | Nicolet | ............... | G06F 13/4068 |
| | | | | 710/104 |
| 9,063,919 B2* | 6/2015 | Wang | ..................... | G06F 13/24 |
| 9,307,694 B2* | 4/2016 | Kuhnel | ............... | G06F 11/2015 |
| 2006/0085103 A1 | 4/2006 | Smith et al. | | |
| 2008/0259945 A1* | 10/2008 | Catterall | ................. | H04L 12/46 |
| | | | | 370/404 |
| 2009/0276666 A1 | 11/2009 | Haley et al. | | |
| 2010/0029209 A1* | 2/2010 | Daum | ................. | B61L 15/0027 |
| | | | | 455/59 |
| 2014/0153412 A1* | 6/2014 | Luecke | ................... | H04L 12/28 |
| | | | | 370/252 |
| 2016/0332646 A1* | 11/2016 | Kraeling | ................ | B61L 25/028 |
| 2016/0355198 A1* | 12/2016 | Dulmage | ................ | H04L 69/18 |
| 2017/0217457 A1* | 8/2017 | Fischer | ............... | B61L 15/0036 |
| 2017/0346786 A1* | 11/2017 | Morimoto | ............. | H04L 41/048 |
| 2018/0013580 A1* | 1/2018 | Takatori | ................. | H04L 12/28 |

FOREIGN PATENT DOCUMENTS

| | | |
|---|---|---|
| EP | 2133255 A2 | 12/2009 |
| GB | 2450520 A | 12/2008 |
| RU | 30390 U1 | 1/2010 |
| RU | 2403161 C2 | 11/2010 |

\* cited by examiner

METHOD FOR OPERATING A DATA TRANSFER SYSTEM, AND DATA TRANSFER SYSTEM

BACKGROUND OF THE INVENTION

Field of the Invention

The invention relates to a method for operating a data transfer system in which a first data transfer device is connected to a first data line that is connected to a first data interface, a second data transfer device is connected to a second data line that is connected to a second data interface, and data is transferred over the first data interface.

Data transfer systems may have a plurality of data transfer devices, among other things for reasons of redundancy. In this way, for example if one of the data transfer devices fails or has a defect, one of the other data transfer devices may be used to transfer data. Furthermore, data transfer systems may have a plurality of data transfer devices of different types, in particular a plurality of buses of different types, for reasons of compatibility.

Data transfer systems having a plurality of data transfer devices, in particular having a plurality of parallel buses, are known among other things from the field of rail transport. For example, in a rail vehicle set, a plurality of train buses may be provided for transferring data between a control unit and a component of the rail vehicle set that is to be controlled. The individual train buses may respectively take the form of a train bus having a single train bus section arranged in a railcar of the rail vehicle set, or of a train bus having a plurality of mutually connected train bus sections arranged in different railcars of the rail vehicle set.

The question of which of a plurality of train buses of a rail vehicle set is to be used for transferring data may be established for example according to the method in DE 10 2006 008 065 B4.

SUMMARY OF THE INVENTION

It is an object of the invention to specify a method by means of which a data transfer system that has a plurality of data transfer devices may be operated reliably.

This object is achieved by a method of the type mentioned in the introduction, in which according to the invention transfer of data over the second data interface is prevented, with an energy supply to the second data interface being switched off in order to prevent the transfer of data over the second data interface.

The invention takes as its starting point the realization that, in a data transfer system having a plurality of data transfer devices, data that is transferred not only over one of the data transfer devices but (unintentionally) in parallel over a plurality of the data transfer devices can result in different interpretations in one or more items of equipment of the data transfer system, for example because the data transfer devices use different communication protocols. This can in turn result in an item of equipment of this kind transmitting erroneous or unauthorized data over at least one of the data transfer devices. Consequently, the different data transfer devices may influence one another.

If a first data transfer device of the data transfer system is used to transfer data, and if a second data transfer device of the data transfer system is not to be used, then an unintended parallel transfer of data over the second data transfer device may cause an unintended or unauthorized action by an item of equipment that is connected to the second data transfer device.

If transfer of data over a data interface that is connected to the unused second data transfer device is prevented, an item of equipment that has this data interface may be uncoupled in terms of communication from the second data transfer device. In this way, it is possible to avoid an unintended and/or erroneous data transfer in the second data transfer device triggering an unintended or unauthorized action by this item of equipment. Furthermore, it is possible to avoid the item of equipment having the effect of an unintended and/or erroneous data transfer in the second data transfer device.

Thus, the invention makes it possible to operate the data transfer system reliably. In particular, reliable operation of the items of equipment of the data transfer system may be achieved.

Because the transfer of data over the second data interface is prevented, the mutual influence of the first and second data transfer devices over the second data line, which is connected both to the second data interface and also to the second data transfer device, may furthermore be avoided.

The term "data interface" in the present document may be understood to mean an interface of an item of equipment, in particular a control unit. Furthermore, the term "data interface" may include an interface between physical systems that is intended to transfer data between the physical systems.

Favorably, the data transfer devices and the data lines are elements of the data transfer system. It is further favorable if the data interfaces are elements of the data transfer system.

Preferably, an electrical energy supply to the second data interface is switched off. The energy supply may be switched off for example by means of an interrupt device, in particular by means of a switch. Here, for example an energy supply line may be interrupted. Switching off the energy supply to the second data interface provides a low-cost way of preventing the transfer of data over the second data interface.

Preferably, the first data line is intended to transfer data between an item of equipment including the first data interface, and the first data transfer device. The second data line is accordingly preferably intended to transfer data between an item of equipment including the second data interface, and the second data transfer device.

Advantageously, both data transfer devices are bidirectional data transfer devices. That is to say that the data transfer devices may preferably transfer data in a first direction and a second direction opposed to the first direction. As an alternative, it is possible for one of the two data transfer devices or each of the two data transfer devices to be a unidirectional data transfer device.

Further, it is advantageous if the two data lines are bidirectional data lines. As an alternative, it is possible for one of the two data lines or each of the two data lines to be a unidirectional data line.

Preferably, the transfer of data over the second data interface is prevented (only) if transfer of data over the first data interface is or becomes enabled. In this way, it may be ensured that, at all times, one of the two data transfer devices may be used for transfer.

The first data transfer device may be a data transfer device of a first type, in particular a bus of a first type. The second data transfer device may in turn be a data transfer device of a second type different from the first type, in particular a bus of a second type. This makes it possible for the type of data transfer device that is more advantageous for the respective application to be usable for transfer.

The two data transfer devices may in principle differ from one another in respect of any desired parameter, for example their data transfer rate, in particular their channel capacity, and/or their maximum data packet size. The term "channel capacity" may include a maximum possible data transfer rate by which data can be transferred over the respective data transfer device without errors. Furthermore, the data transfer devices may be based on different communication protocols or operate with different communication protocols.

In principle, it is possible for the first and the second data transfer device to be data transfer devices of the same type. In a case of this kind, the second data transfer device may be provided for example for reasons of redundancy.

According to an advantageous embodiment of the invention, both data transfer devices take the form of a bus or a network. In principle, it is possible for one of the two data transfer devices to take the form of a bus and for the other of the two data transfer devices to take the form of a network.

The first data transfer device may for example take the form of a time-multiplexed multiple controller, a Wire Train Bus or an Ethernet Train Backbone. Accordingly, the second data transfer device may for example take the form of a time-multiplexed multiple controller, a Wire Train Bus or an Ethernet Train Backbone.

In a preferred embodiment of the invention, the first data transfer device has a higher data transfer rate and/or a higher maximum data packet size than the second data transfer device. That is to say that, of the two data transfer devices, the one that has a higher data transfer rate and/or a higher maximum data packet size is preferably used.

In principle, however, it is possible for the second data transfer device to have a higher data transfer rate and/or a higher maximum data packet size than the first data transfer device. In this case, the transfer of data over the second data interface is for example prevented if the second data transfer device has a functional fault. That is to say that, in the event of a functional fault of the "faster" of the two data transfer devices, the "slower" data transfer device may be used for data transfer. Furthermore, in the event that the second data transfer device has a higher data transfer rate and/or a higher maximum data packet size than the first data transfer device, it may be provided for the transfer of data over the second data transfer device to be prevented if the second data transfer device has more network nodes than the first data transfer device.

Preferably, after the energy supply to the second data interface has been switched off, the item of equipment that includes the second data interface continues to be supplied with energy, in particular electrical energy. That is to say that preferably only the energy supply to the second data interface is switched off and not that to the whole item of equipment. In this way, the item of equipment that includes the second data interface may continue to be active or to be operated after the energy supply to the second data interface has been switched off.

Further, in order to prevent the transfer of data over the second data interface, the second data line may be interrupted. The term "interruption" of a data line in the present document may include disconnecting a data line, for example by means of an interrupt device, in particular by means of a switch. Interrupting the second data line provides a particularly reliable way of preventing the transfer of data over the second data interface, in particular because in this case, favorably, the second data line is physically disconnected.

Moreover, in order to prevent the transfer of data over the second data interface, transfer of data within the second data interface may be prevented. Preventing the transfer of data within the second data interface also provides a low-cost way of preventing the transfer of data over the second data interface. Moreover, this way can advantageously be implemented with little extra work, by means of software. Preventing the transfer of data within the second data interface may for example be achieved by interrupting a data-carrying element of the second data interface.

Preventing the transfer of data within the second data interface favorably prevents transfer of data from the second data interface to another element of the item of equipment in which the second data interface is included. The term "interruption" of a data-carrying element of the second data interface may include disconnecting this element, for example by means of an interrupt device, in particular by means of a switch. This switch may for example be an electronically actuable switch, in particular a switch that may be controlled with the aid of software functions or software-based control commands.

Furthermore, it is possible to combine the above-mentioned measures in any desired way in order to prevent the transfer of data over the second data interface.

In a first advantageous embodiment variant of the invention, the first data interface and the second data interface may be interfaces of the same item of equipment, in particular of the same control unit. In a case of this kind, it may for example be provided for the transfer of data over the second data interface to be prevented by this item of equipment (control unit).

Preventing the transfer of data over the second data interface by the item of equipment may accordingly include the item of equipment triggering an action which prevents data transfer over the second data interface.

In a second advantageous embodiment variant of the invention, the first data interface may be an interface of a first item of equipment, in particular a first control unit. By contrast, the second data interface may be an interface of a second item of equipment, in particular a second control unit. In this case, the transfer of data over the second data interface is preferably prevented by the first item of equipment (control unit). This has the advantage that preventing data transfer may be triggered independently of the status of the first item of equipment. That is to say that even if the first item of equipment has a functional fault, the preventing of data transfer may preferably be triggered, because the second item of equipment is advantageously not affected by this functional fault. As an alternative, it is possible for data transfer over the second data interface to be prevented by the second item of equipment.

Furthermore, the method described above may be applied analogously in the case of a data transfer system having more than two data transfer devices, more than two data lines and more than two data interfaces.

Further, the invention relates to a data transfer system, having a first and a second data transfer device, a first and a second data interface, and a first data line that is connected to the first data transfer device and the first data interface, and a second data line that is connected to the second data transfer device and the second data interface, wherein the data transfer system has an energy supply line that is connected to the second data interface, wherein the interrupt device is an element of the energy supply line.

According to the invention, the data transfer system has an interrupt device that is intended to prevent transfer of data over the second data interface. This makes it possible to operate the data transfer system reliably.

This transfer system may in particular be the data transfer system described above in conjunction with the method. That is to say that the elements mentioned above that relate to a device may be elements of this data transfer system.

Conversely, the method described above may be used to operate this data transfer system.

In a first advantageous variant of the invention, the data transfer system includes an item of equipment that includes the first and the second data interface. Preferably, this item of equipment is intended to transmit a control command to the interrupt device, in particular over a control line. This item of equipment may in particular be a control unit that is for example a constituent part of a train control system.

The control command may for example be a command for preventing data transfer over the second data interface, or a command for enabling data transfer over the second data interface. Favorably, the interrupt device is intended to prevent or enable transfer of data over the second data interface once a control command of this kind is received.

In a second advantageous variant of the invention, the data transfer system includes a first item of equipment that includes the first data interface, and a second item of equipment that includes the second data interface. Preferably, the first item of equipment and/or the second item of equipment is a control unit. Advantageously, the first item of equipment is connected to the interrupt device by way of a control line. Further, it is advantageous if the first item of equipment is intended to transmit a control command to the interrupt device, in particular over said control line.

Furthermore, the interrupt device may include a device that is intended to disconnect a line section irreversibly. A device of this kind may for example be a heating device for melting a line section. However, it is preferred if the interrupt device is intended to interrupt the transfer of data over the second data interface and later enable it again.

The interrupt device may take the form for example of a switch, in particular an electrically actuable switch. This is because a switch provides a low-cost way, requiring little extra work, of preventing the transfer of data and when necessary enabling it again. The switch may in particular be an electronically actuable switch, in particular a switch that may be controlled with the aid of software functions or software-based control commands. Among other things, the interrupt device may be an element of one of the above-mentioned items of equipment.

Moreover, the interrupt device may be connected to a control line. This may in particular be the above-mentioned control line. The interrupt device may receive, over the control line, control commands, in particular software-based control commands, for example for opening and closing the switch. Furthermore, it is favorable if the interrupt device may be controlled with the aid of software functions or software-based control commands.

Further, the data transfer system may have a plurality of interrupt devices that are each intended to prevent transfer of data over the second data interface. One of these interrupt devices may for example be an element of the energy supply line. Another of these interrupt devices may for example be an element of the second data line. Yet another of these interrupt devices may be an element of the second data interface.

Furthermore, the data transfer system may have at least one further interrupt device that is intended to prevent transfer of data over the first data interface. In particular, the data transfer system may have a plurality of such further interrupt devices. One of these further interrupt devices may for example be an element of the energy supply line of the first data interface. Another of these further interrupt devices may for example be an element of the first data line. Yet another of these further interrupt devices may be an element of the first data interface.

Furthermore, the invention relates to a rail vehicle set having a plurality of cars, in particular having a plurality of railcars, and having a data transfer system of the type described above.

Preferably, the second data transfer device of the data transfer system is a common data transfer device for a plurality of cars, for example all the railcars, of the rail vehicle set. In particular, the second data transfer device may be a common train bus or a common data bus.

The term "train bus" may include a bus provided for a train control system. The data bus may for example be a bus used for a passenger information system.

The first data transfer device may for example be a data transfer device of only a single car or of some of the cars of the rail vehicle set.

Furthermore, each of the two data transfer devices of the data transfer system may be a common data transfer device for a plurality of cars, for example all the railcars, of the rail vehicle set. Each of the two data transfer devices may for example be a common train bus or a common data bus.

Where the first and the second data interface are interfaces of different items of equipment (control units), these items of equipment may in particular be arranged in the same car of the rail vehicle set.

The above description of advantageous embodiments of the invention includes numerous features of which some are reproduced grouped together in the individual subclaims. However, the features may favorably also be considered individually and be grouped together in further combinations that are useful. In particular, these features may in each case be combined individually and in any desired suitable combination with the method according to the invention and the data transfer system according to the invention. In this way, method features may also be regarded as a property of the corresponding device unit if worded in terms of a device, and vice versa.

Although some terms are respectively used in the description and the claims in the singular or in combination with a numeral, the scope of the invention should not be restricted to the singular or the respective numeral for these terms. Further, the words "a" and "an" should not be understood as indicative of number but as indefinite articles.

The above-mentioned properties, features and advantages of the invention, and the manner in which these are achieved, will be more clearly understood in conjunction with the description below of the exemplary embodiments of the invention, which are explained in more detail with reference to the drawings. The exemplary embodiments serve to explain the invention and do not restrict the invention to the combinations of features indicated therein, even in respect of functional features. Moreover, features of any particular exemplary embodiment that are suitable therefor may also be considered explicitly in isolation, omitted from an exemplary embodiment, incorporated into another exemplary embodiment to supplement the latter and combined with any of the claims as desired.

DESCRIPTION OF THE INVENTION

Figure 1:
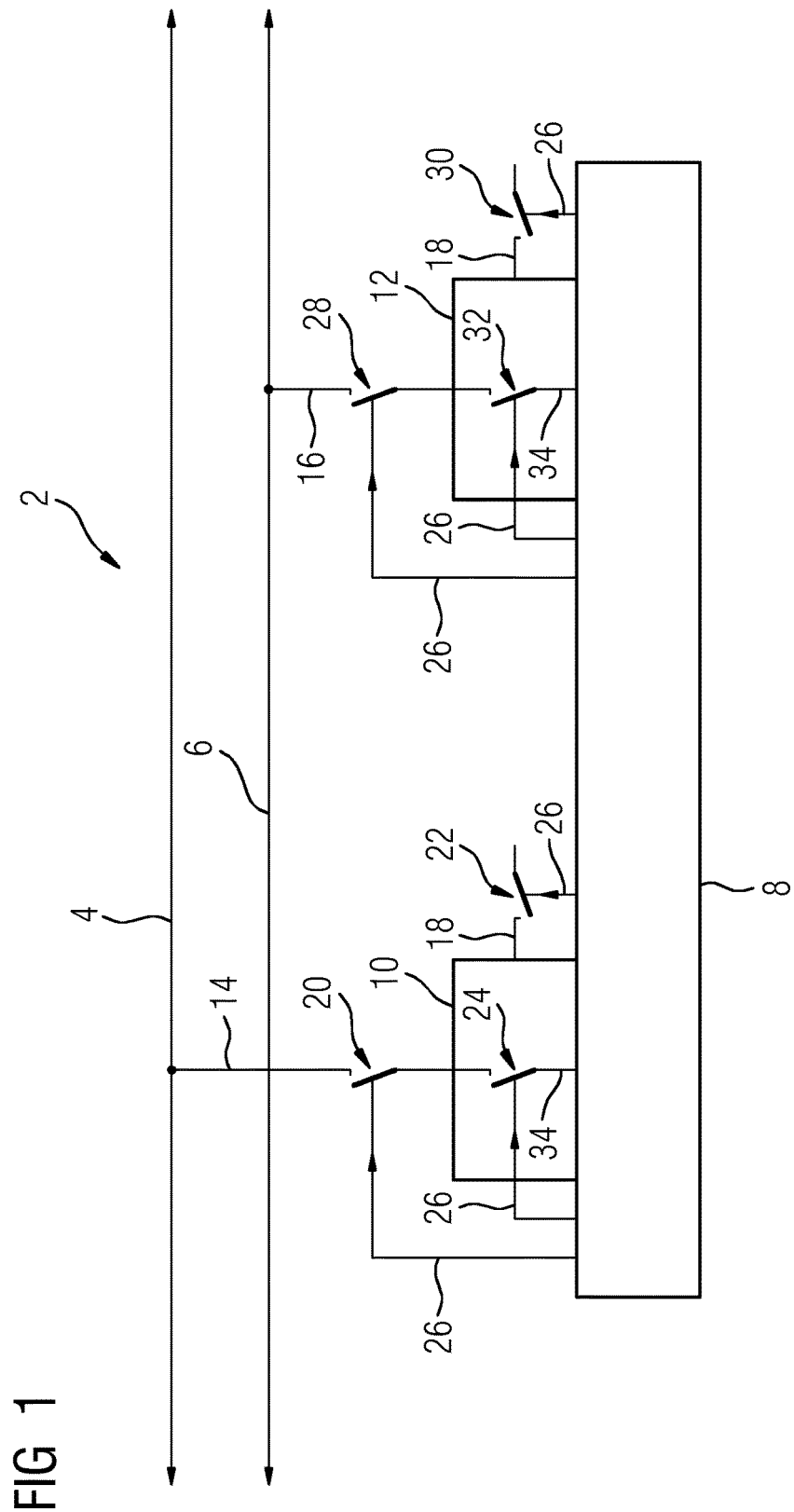
FIG. 1 shows a data transfer system that includes two data transfer devices, two data lines and a control unit having two data interfaces.

FIG. 1 shows a data transfer system 2 in a schematic illustration. The data transfer system 2 includes a first data transfer device 4 and a second data transfer device 6. The two data transfer devices 4, 6 in the present exemplary embodiment each take the form of a bus, in particular a train bus for a train control system. Furthermore, the data transfer system 2 includes a control unit 8 having a first data interface 10 and a second data interface 12.

Furthermore, the data transfer system 2 has a first data line 14 that is connected to the first data interface 10 and to the first data transfer device 4. Moreover, the data transfer system 2 has a second data line 16 that is connected to the second data interface 12 and to the second data transfer device 6.

The two data transfer devices 4, 6 are bidirectional data transfer devices, and the two data lines 14, 16 are bidirectional data lines.

Furthermore, the first data transfer device 4 has a higher data transfer rate than the second data transfer device 6. The data transfer devices 4, 6 are thus data transfer devices of different types.

Further, the data transfer system 2 includes two energy supply lines 18. One of these two energy supply lines 18 is connected to the first data interface 10 and is intended to supply the first data interface 10 with power. The other of the two energy supply lines 18 is connected to the second data interface 12 and is intended to supply the second data interface 12 with power.

Furthermore, the data transfer system 2 in the present exemplary embodiment has a first interrupt device 20, a second interrupt device 22 and a third interrupt device 24. Each of these three interrupt devices 20, 22, 24 takes the form of an electrically or electronically actuable switch and is intended to prevent transfer of data over the first data interface 10. Moreover, the three interrupt devices 20, 22, 24 are each connected to the control unit 8 by way of a control line 26.

The first interrupt device 20 is an element of the first data line 14. By contrast, the second interrupt device 22 is an element of the energy supply line 18 that is connected to the first data interface 10, and the third interrupt device 24 is an element of the first data interface 10.

Further, the data transfer system 2 in the present exemplary embodiment has a fourth interrupt device 28, a fifth interrupt device 30 and a sixth interrupt device 32. Each of the three last-mentioned interrupt devices 28, 30, 32 takes the form of an electrically or electronically actuable switch and is intended to prevent transfer of data over the second data interface 12. Moreover, the three last-mentioned interrupt devices 28, 30, 32 are each connected to the control unit 8 by way of a control line 26.

The fourth interrupt device 28 is an element of the second data line 16. By contrast, the fifth interrupt device 30 is an element of the energy supply line 18 that is connected to the second data interface 12, and the sixth interrupt device 32 is an element of the second data interface 12.

FIG. 1 illustrates the above-mentioned interrupt devices 20-24, 28-32 in an open condition only because this makes it clear that the interrupt devices 20-24, 28-32 each take the form of a switch. During operation of the data transfer system 2, preferably at least some of the switches are closed.

The interrupt devices 20-24, 28-32 are controlled by the control unit 8. To change the condition ("open" or "closed") of the respective interrupt device 20-24, 28-32, the control unit 8 transmits a corresponding control command to the respective interrupt device 20-24, 28-32.

So that data can be transferred over the first data interface 10, it is necessary for the first three interrupt devices 20, 22, 24 to be closed such that, in terms of communication, the first data interface 10 is coupled to the first data transfer device 4 by way of the first data line 14. This has the effect that the first data transfer device 4—that is to say the one of the two data transfer devices 4, 6 that has the higher data transfer rate—is used by the control unit 8 for data transfer.

So that an unintended and/or erroneous data transfer in the second data transfer device 6 cannot trigger unintended action in the control unit 8, or so that the control unit 8 cannot have the effect of unintended and/or erroneous data transfer in the second data transfer device 6, transfer of data over the second data interface 12 is prevented.

In order to prevent the transfer of data over the second data interface 12, the second data line 16 is interrupted or disconnected using the fourth interrupt device 28. As an alternative or in addition, the energy supply line 18 that is connected to the second data interface 12 is switched off using the fifth interrupt device 30, with the control unit 8 continuing to be supplied with power (by way of an energy supply line not illustrated in the figures). As an alternative or in addition, a data-carrying element 34 of the second data interface 12 by way of which data from the second data interface 12 is carried to one or more other functional units of the control unit 8 is interrupted using the sixth interrupt device 32, and as a result the transfer of data within the second data interface 12 is prevented.

If for example a functional fault of the first data transfer device 4 and/or the first device interface 10 occurs, the last-mentioned interrupt devices 28, 30, 32 are put into a closed condition. In this way, in terms of communication, the second data interface 12 is coupled to the first data transfer device 4 by way of the second data line 16. This has the effect that the second data transfer device 6—that is to say the one of the two data transfer devices 4, 6 that has the lower data transfer rate—is used by the control unit 8 for data transfer.

In order in such a case to prevent the transfer of data over the first data interface 10, the first data line 14 is interrupted or disconnected using the first interrupt device 20. As an alternative or in addition, the energy supply line 18 that is connected to the first data interface 10 is switched off using the second interrupt device 22, with the control unit 8 continuing to be supplied with power. As an alternative or in addition, a data-carrying element 34 of the first data interface 10 by way of which data from the second data interface 12 is carried to one or more other functional units of the control unit 8 is interrupted using the third interrupt device 24, and as a result the transfer of data within the first data interface 10 is prevented.

In principle any of the first three interrupt devices 20, 22, 24 as desired is sufficient to prevent the transfer of data over the first data interface 10. That is to say that in principle one or two of the first three interrupt devices 20, 22, 24 could be dispensed with.

Accordingly, in principle any of the other three interrupt devices 28, 30, 32 as desired is sufficient to prevent the transfer of data over the second data interface 12. Thus, in principle one or two of the other three interrupt devices 28, 30, 32 could be dispensed with.

Figure 2:
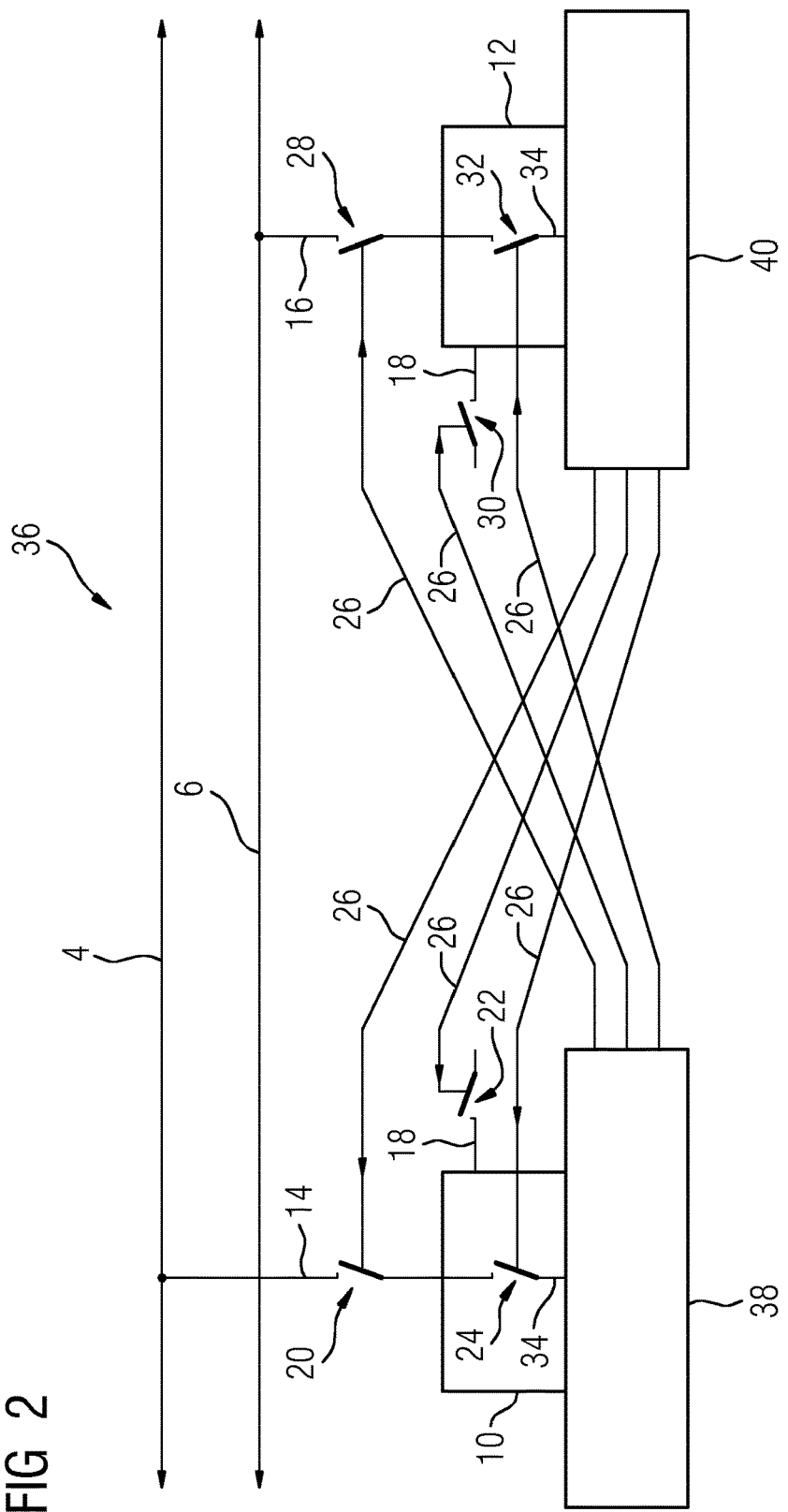
FIG. 2 shows a further data transfer system that includes two data transfer devices, two data lines and two control units each having a data interface.

FIG. 2 shows a further data transfer system 36 in a schematic illustration.

The description of the succeeding exemplary embodiment will be limited primarily to the differences from the preceding exemplary embodiment, to which the reader is referred for the unchanged features and functions. Substantially like or mutually corresponding elements are designated by the same reference numerals where appropriate, and features that are not mentioned are incorporated into the succeeding exemplary embodiment without being described again.

The further data transfer system 36 differs from the data transfer system 2 in FIG. 1 among other things in that the further data transfer system 36 has (instead of the single control unit 8) a first control unit 38 and a second control unit 40.

In the present exemplary embodiment, the first data interface 10 is an element of the first control unit 38 and the second data interface 12 is an element of the second control unit 40.

Moreover, the first three interrupt devices 20, 22, 24—that is to say the interrupt device 20 arranged in the first data line 14, the interrupt device 24 arranged in the first data interface 10 and the interrupt device 22 arranged in the energy supply line 18 by way of which the first data interface 10 is supplied with power—are connected to the second control unit 40 by way of a respective control line 26. Accordingly, the other three interrupt devices 28, 30, 32 are connected to the first control unit 38 by way of a respective control line 26.

The second control unit 40 is intended to transmit control commands to the first three interrupt devices 20, 22, 24, whereas the first control unit 38 is intended to transmit control commands to the other three interrupt devices 28, 30, 32.

In the present exemplary embodiment, prevention and enabling of data transfer over the first data interface 10 is triggered by the second control unit 40, in that the second control unit 40 transmits a corresponding control command to at least one of the first three interrupt devices 20, 22, 24. By contrast, prevention and enabling of data transfer over the second data interface 12 is triggered by the first control unit 38, in that the first control unit 38 transmits a corresponding control command to at least one of the other three interrupt devices 28, 30, 32.

Figure 3:
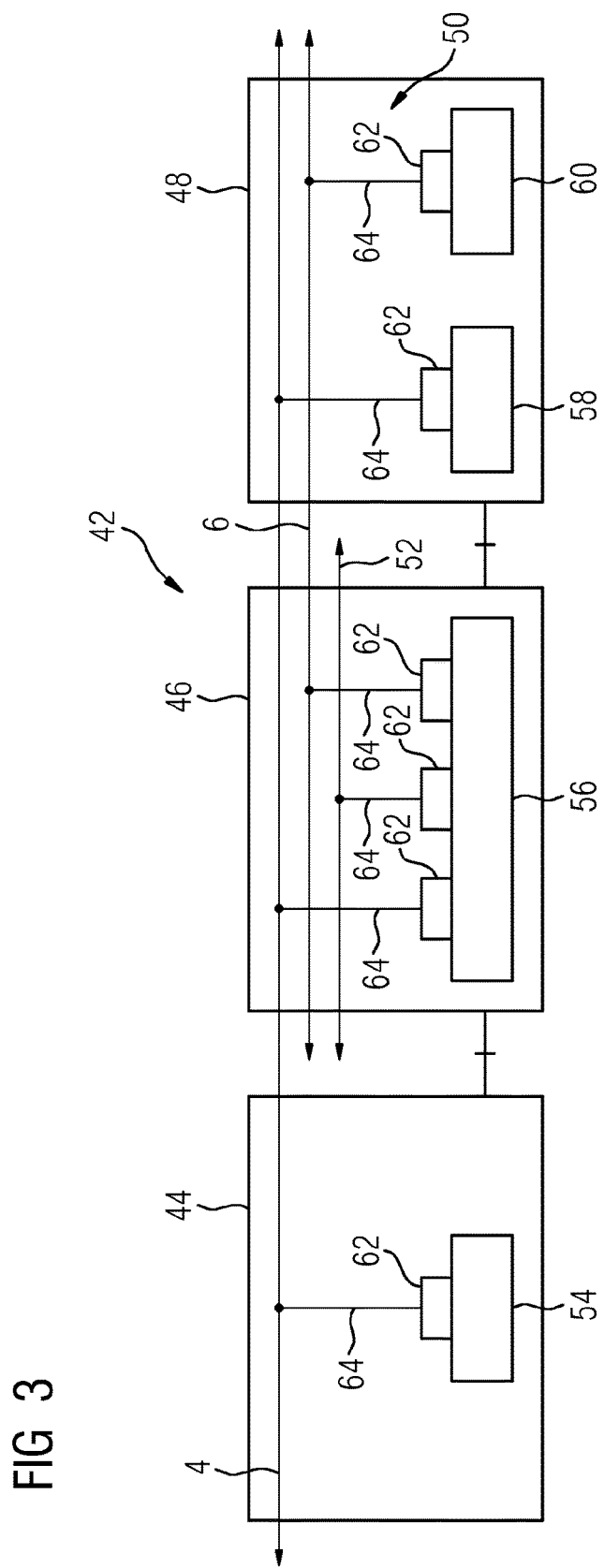
FIG. 3 shows a first rail vehicle set having three railcars and a data transfer system.

FIG. 3 shows a first rail vehicle set 42 in a schematic illustration. The rail vehicle set 42 includes a first railcar 44, a second railcar 46 and a third railcar 48. In addition to these three railcars 44, 46, 48, the rail vehicle set 42 may include further cars that are not illustrated in the figures.

Further, the rail vehicle set 42 has a data transfer system 50 that is a constituent part of a train control system. The data transfer system 50 includes a first data transfer device 4, a second data transfer device 6 and a third data transfer device 52, wherein the data transfer devices 4, 6, 52 each take the form of a train bus. Moreover, the second data transfer device 6 has a higher data transfer rate than the first data transfer device 4. The third data transfer device 52 in turn has a higher data transfer rate than the second data transfer device 6.

The one first data transfer device 4 is a common train bus for all three railcars 44, 46, 48. The second data transfer device 6 is by contrast a common train bus for the second and third railcars 46, 48 but not the first railcar 44. Further, the third data transfer device 52 is a train bus for the second railcar 46 but not the other two railcars 44, 48.

Furthermore, the data transfer system 50 includes a first control unit 54 that is arranged in the first railcar 44, a second control unit 56 that is arranged in the second railcar 46, and a third and a fourth control unit 58, 60 that are each arranged in the third railcar 48.

The first, third and fourth control units 54, 58, 60 each have a single data interface 62. By contrast, the second control unit 56 has three data interfaces 62.

Further, the data interface 62 of the first control unit 54 and the data interface 62 of the third control unit 58 are each connected to the first data transfer device 4 by way of a data line 64. The data interface 62 of the fourth control unit 60 is connected to the second data transfer device 6 by way of a data line 64.

Furthermore, one of the three data interfaces 62 of the second control unit 56 is connected to the first data transfer device 4 by way of a data line 64. Another of the three data interfaces 62 of the second control unit 56 is connected to the second data transfer device 6 by way of a data line 64. Moreover, the third of the three data interfaces 62 of the second control unit 56 is connected to the third data transfer device 52 by way of a data line 64.

Furthermore, for each of the data interfaces 62, the data transfer system 50 includes an energy supply line that is connected to the respective data interface 62. Moreover, for each of the data interfaces 62, the data transfer system 50 includes at least one interrupt device, which is intended to prevent transfer of data over the respective data interface 62, and a control line for transmitting control commands to the respective interrupt device. For the sake of greater clarity, the energy supply lines, the interrupt device and the control lines are not illustrated in FIG. 3 or in the subsequent figures.

One of the control units 54, 56, 58, 60 is operated as a master control unit, and the other control units 54, 56, 58, 60 are operated as slave control units.

So that all the control units 54, 56, 58, 60 can exchange data between themselves or with other components of the rail vehicle set, the first data transfer device 4 is used for data transfer, since the first data transfer device 4—unlike the other two data transfer devices 6, 52—is a common data transfer device for all the railcars 44, 46, 48.

So that, further, unintended and/or erroneous data transfer in the second or third data transfer device 6, 52 cannot trigger an unintended action in one of the control units 54, 56, 58, 60, or so that none of the control units 54, 56, 58, 60 can have the effect of unintended and/or erroneous data transfer in the second or third data transfer device 6, 52, transfer of data over the data interfaces 62 that are connected to the second or third data transfer device 6, 52 is prevented, in a manner analogous to that described in conjunction with FIG. 1 and FIG. 2.

The transfer of data over the data interface 62 of the fourth control unit 60 is prevented by the third control unit 58. By contrast, the second control unit 56 itself prevents the transfer of data over those of its data interfaces 62 that are connected to the second or third data transfer device 6, 52.

Figure 4:
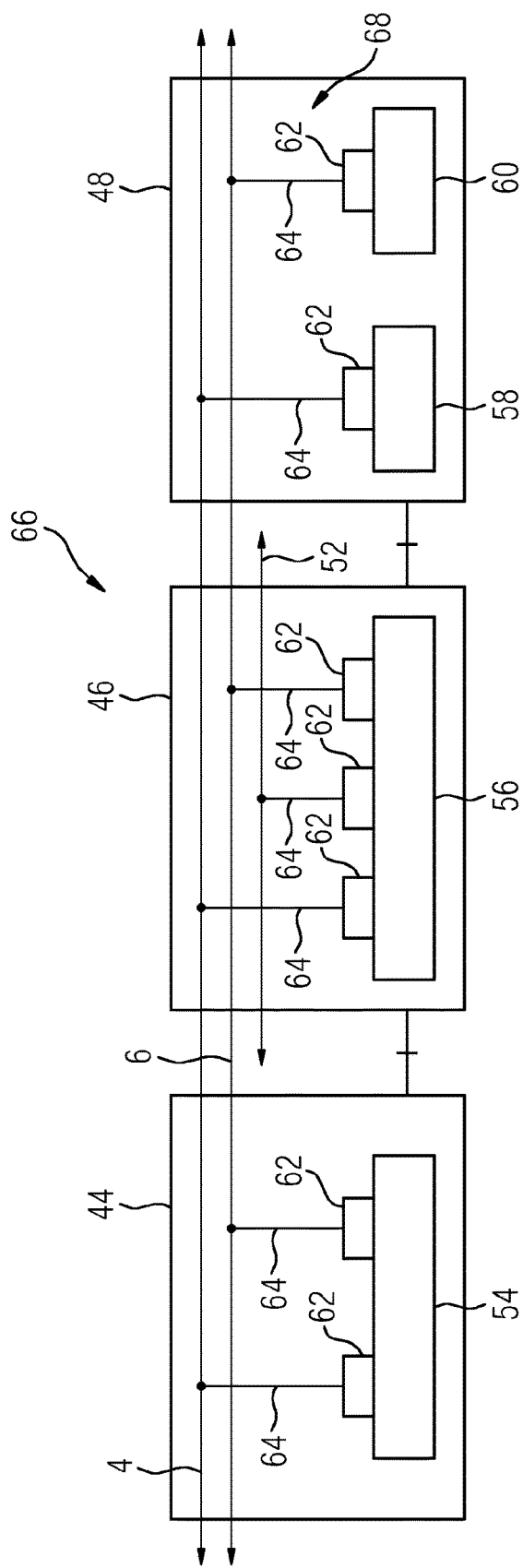
FIG. 4 shows a second rail vehicle set having three railcars and another data transfer system.

FIG. 4 shows a second rail vehicle set 66 in a schematic illustration.

The description of the succeeding exemplary embodiments will be limited primarily to the differences from the preceding exemplary embodiment described in conjunction with FIG. 3, to which the reader is referred for the unchanged features and functions. Substantially like or mutually corresponding elements are designated by the same reference numerals where appropriate, and features that are not mentioned are incorporated into the succeeding exemplary embodiments without being described again.

The data transfer system 68 of the second rail vehicle set 66 differs from the data transfer system 50 in FIG. 3 among other things in that, in the case of the data transfer system 68 of the second rail vehicle set 66, both the first data transfer device 4 and the second data transfer device 6 are respectively a common data transfer device for all three railcars 44, 46, 48.

Further, in the present data transfer system 68, the first control unit 54 has two data interfaces 62. One of these two data interfaces 62 is connected to the first data transfer device 4 by way of a data line 64, and the other of the two data interfaces 62 is connected to the second data transfer device 6 by way of a data line 64.

In the present exemplary embodiment, the second data transfer device 6 is used for data transfer. Further, and in a manner analogous to that described in conjunction with FIG. 1 and FIG. 2, transfer of data over the data interfaces 62 that are connected to the first or third data transfer device 4, 52 is prevented.

The transfer of data over the data interface 62 of the third control unit 58 is prevented by the fourth control unit 60. By contrast, the second control unit 56 itself prevents the transfer of data over those of its data interfaces 62 that are connected to the first or third data transfer device 4, 52. Similarly, the first control unit 54 itself prevents the transfer of data over those of its data interfaces 62 that are connected to the first data transfer device 4.

If there is a functional fault of the second data transfer device 6, then as an alternative the first data transfer device 4 may be used. In a case of this kind, in a manner analogous to that described in conjunction with FIG. 1 and FIG. 2, transfer of data over the data interfaces 62 that are connected to the second or third data transfer device 6, 52 is prevented.

Figure 5:
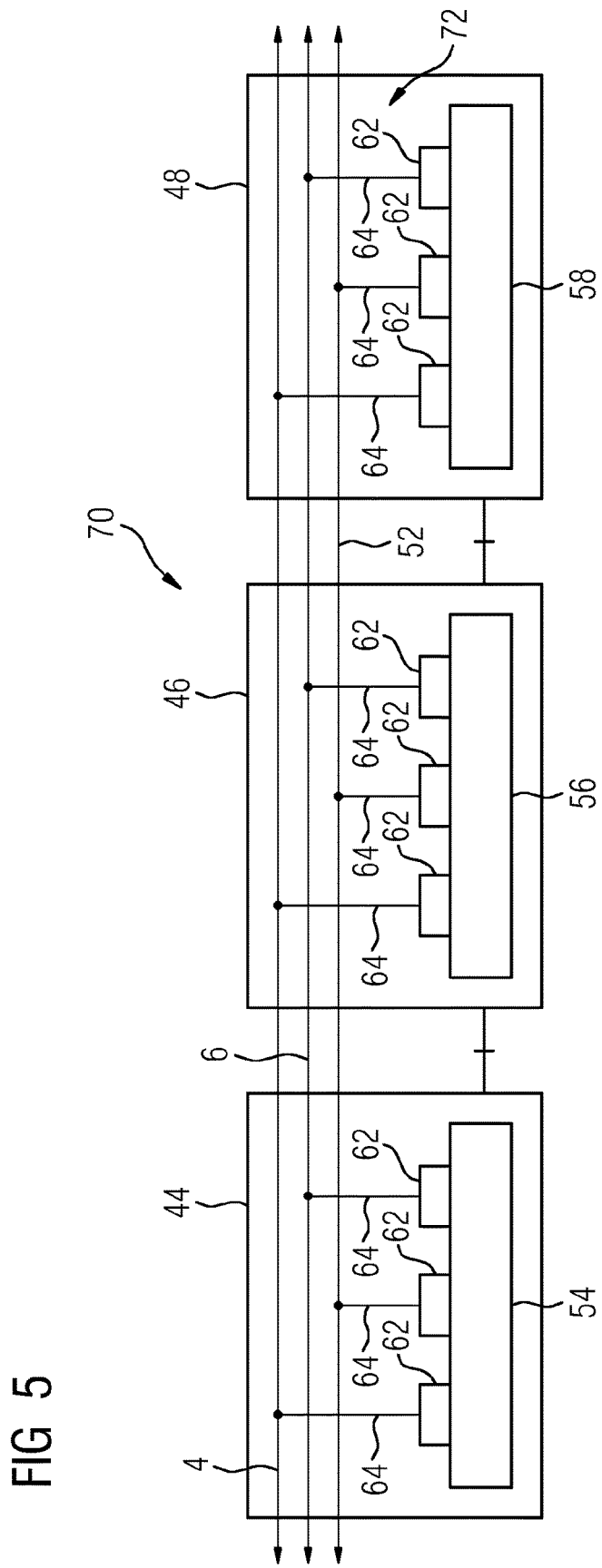
FIG. 5 shows a third rail vehicle set having three railcars and yet another data transfer system.

FIG. 5 shows a third rail vehicle set 70 in a schematic illustration.

The data transfer system 72 of the third rail vehicle set 70 differs from the data transfer system 50 in FIG. 3 among other things in that, in the data transfer system 72 of the third rail vehicle set 70, all three data transfer devices 4, 6, 52 are common data transfer devices for all three railcars 44, 46, 48.

In the present exemplary embodiment, precisely one control unit 54, 56, 58 is arranged in each of the three railcars 44, 46, 48. That is to say that there is no second control unit in the third railcar 48. Further, in the present data transfer system 72, each of the control units 54, 56, 58 has three data interfaces 62. Of the three data interfaces 62 of the respective control unit 54, 56, 58, in each case one data interface 62 is connected to the first data transfer device 4 by way of a data line 64, another data interface 62 is connected to the second data transfer device 6 by way of a data line 64, and the third data interface 62 is connected to the third data transfer device 52 by way of a data line 64.

In the present exemplary embodiment, the third data transfer device 52 is used for data transfer. In a manner analogous to that described in conjunction with FIG. 1 and FIG. 2, transfer of data over the data interfaces 62 that are connected to the first or second data transfer device 4, 6 is prevented.

Each of the three control units 54, 56, 58 itself prevents the transfer of data over those of its data interfaces 62 that are connected to the first or second data transfer device 4, 6.

If there is a functional fault of the third data transfer device 52, then as an alternative one of the other two data transfer devices 4, 6 may be used. In a case of this kind, in a manner analogous to that described in conjunction with FIG. 1 and FIG. 2, transfer of data over the data interfaces 62 that are connected to the respectively other two data transfer devices is prevented.

Although the invention has been illustrated and described in detail by means of the preferred exemplary embodiments, the invention is not restricted by the disclosed examples, and other variations may be derived herefrom without departing from the scope of protection of the invention.

The invention claimed is:

1. A method for operating a data transfer system, the method comprising the following steps:
   connecting a first data transfer device to a first data line;
   connecting the first data line to a first data interface of an item of equipment;
   connecting a second data transfer device to a second data line;
   connecting the second data line to a second data interface of the item of equipment;
   transferring data over the first data interface;
   preventing data transfer over the second data interface;
   switching off an energy supply to the second data interface in order to prevent a transfer of data over the second data interface; and
   continuing to supply the item of equipment with energy after switching off the energy supply to the second data interface.

2. The method according to claim 1, wherein the first data transfer device is a data transfer device of a first type, and the second data transfer device is a data transfer device of a second type different than the first type.

3. The method according to claim 2, wherein the first and second data transfer devices are buses.

4. The method according to claim 1, wherein the first and second data transfer devices are buses or networks, and the first data transfer device has a higher data transfer rate than the second data transfer device.

5. The method according to claim 1, which further comprises interrupting the second data line in order to prevent the transfer of data over the second data interface.

6. The method according to claim 1, which further comprises preventing data transfer within the second data interface in order to prevent the transfer of data over the second data interface.

7. The method according to claim 6, which further comprises preventing the data transfer within the second data interface by interrupting a data-carrying element of the second data interface.

8. The method according to claim 1, which further comprises providing the first and second data interfaces as interfaces of a control unit, and using the control unit to prevent the transfer of data over the second data interface.

9. The method according to claim 1, which further comprises providing the first data interface as an interface of a first control unit, providing the second data interface as a data interface of a second control unit, and using the first control unit to prevent the transfer of data over the second data interface.

10. A data transfer system, comprising:
first and second data transfer devices;
an item of equipment including first and second data interfaces;
a first data line connected to said first data transfer device and connected to said first data interface;
a second data line connected to said second data transfer device and connected to said second data interface;
an energy supply line connected to said second data interface;
an interrupt device for preventing a transfer of data over said second data interface, said interrupt device being an element of said energy supply line, or an element of said second data line or an element of said second data interface; wherein said item of equipment, which includes said second data interface, is continued to be supplied with energy after switching off said energy supply to said second data interface to prevent a transfer of data over said second data interface.

11. The data transfer system according to claim 10, which further comprises a control unit including said first and second data interfaces, said control unit being configured to transmit a control command to said interrupt device.

12. The data transfer system according to claim 10, which further comprises:
a first control unit including said first data interface;
a second control unit including said second data interface; and
a control line connected between said first control unit and said interrupt device for transmitting a control command to said interrupt device.

13. The data transfer system according to claim 10, wherein said interrupt device is an electrically actuable switch.

14. A rail vehicle set, comprising:
a plurality of railcars; and
a data transfer system according to claim 10;
said second data transfer device of said data transfer system being connected in common to all of said railcars, or
said first and second data transfer devices of said data transfer system each being connected in common to all of said railcars.

15. The rail vehicle set according to claim 14, wherein said second data transfer device is a train bus or data bus or each of said first and second data transfer devices is a respective train bus or data bus.

16. The data transfer system according to claim 10, which further comprises a switch connected to switch off said energy supply to said second data interface to prevent the transfer of data over said second data interface, wherein the item of equipment, which includes said second data interface, is continued to be supplied with energy after said switch switches off said energy supply to said second data interface.

* * * * *